United States Patent [19]

Lam

[11] Patent Number: 4,903,069

[45] Date of Patent: Feb. 20, 1990

[54] AUTOMATIC THREE-DIMENSIONAL PHOTO PRINTER TO ALIGN THE KEY SUBJECT IMAGE

[75] Inventor: Nicholas L. Lam, Quarry Bay, Hong Kong

[73] Assignee: Image Technology, Inc., Doraville, Ga.

[21] Appl. No.: 315,126

[22] Filed: Feb. 24, 1989

[51] Int. Cl.$^4$ .................... G03B 27/32; G03B 35/14
[52] U.S. Cl. ........................................ 355/22; 354/114
[58] Field of Search .................. 355/22; 354/112, 114

[56] References Cited

U.S. PATENT DOCUMENTS

| | | | |
|---|---|---|---|
| 3,895,867 | 7/1975 | Lo et al. | 355/22 |
| 3,953,869 | 4/1976 | Lo et al. | 355/22 |
| 4,120,562 | 10/1978 | Lo et al. | 355/22 |
| 4,132,468 | 1/1979 | Lo et al. | 355/22 |
| 4,468,115 | 8/1984 | Lao | 354/112 |

Primary Examiner—Monroe H. Hayes
Attorney, Agent, or Firm—Harold L. Marquis

[57] ABSTRACT

A method and a printer for printing an image array on the photosensitive surface of lenticular print film from a set of 2D views which involves moving the negative carrier on the printer in accordance with the equation $$S = \frac{(K + F)T}{K}$$

where
S is the distance between key subject images of adjacent 2D views,
T is the separation between adjacent camera lenses,
F is the back focal length of the camera lens,
K is the distance between the lens of the camera and the key subject K' and moving the negative by the appropriate S value between printing of adjacent 2D views.

A fully automatic and semi-automatic printer is provided.

9 Claims, 7 Drawing Sheets

AUTOMATIC THREE-DIMENSIONAL PHOTO PRINTER TO ALIGN THE KEY SUBJECT IMAGE

BACKGROUND OF THE INVENTION

In lenticular type three-dimensional (3D) photography, a plurality of two-dimensional (2D) views of the scene are taken from a number of horizontally spaced vantage points and a series of 2D images is then composed and printed at the focal plane on the emulsion of each of the lenticules of the lenticular print film to form a 3D composite image of the scene.

When composing a 3D photograph, the key subject image on each of the 2D views must be aligned and accurately registered on the lenticular print material in order to produce an in focus 3D image. In the past, the person operating the printer would visually position each negative view into the light gate of the printer to align the key subject on the lenticular print material. This was usually done by visual alignment of each view in an optical or video device or using cross hairs for centering the key subject on the print material. Each of the 2D negative views must be printed on the print material. The key subject in each of these views needs to be manually aligned because the spacing between the key subject images between each adjacent 2D view is different from picture to picture because each picture has the key subject at a different distance. This process of aligning the key subject of each view is troublesome and time consuming and has made the three dimensional printing process very complicated. The alignment is especially difficult with 2D negative films which are over or under exposed.

PRIOR ART

U.S. Pat. No. 4,158,501, (Smith et al) discloses a method of printing stereoscopic pictures which involves first marking the homologous points on each frame in a stereo pair. The marking can be done by mechanical or optical means. In the process of viewing the film strip these markings are then mechanically or optically registered by the printer in printing the film at the precise location on the printing material. The apparatus for optically viewing the film strips and marking the frames to locate the homologous points is disclosed in U.S. Pat. No. 4,494,864 (Smith et al). In the Smith patents it is necessary to individually view each of the frames in order to place the registration mark on the frame.

U.S. Pat. No. 3,895,867 (Lo et al) discloses a method of printing in which each negative is visually examined to select the object in the negative which will become the center plane of the picture. It is necessary to do this visual examination for each frame of the negative and manually align the center plane of each negative at time of printing. Apparatus and method for printing 3D photographs is disclosed in U.S. Pat. No. 3,953,869 (Lo et al). The registration of negatives in the printer is simplified by adjusting the distance between the lenses in the camera according to the distance of the center plane object at time of taking the picture. This allows the parameters of the enlarger - print film system to be held constant.

U.S. Pat. No. 4,120,562 (Lo et al) discloses a composing apparatus for changing the angle of projection of each of the two dimensional views by a predetermined amount during the projection. The amount of change is predetermined by the formula W/N where N is the number of 2D views to be projected behind each lenticule and W is the width of the lenticule.

U.S. Pat. No. 3,482,913 (Glenn) discloses the composing of three- dimensional pictures using the same number of projectors for printing the picture as there are vantage points from which the picture was taken by multiple cameras. In other words, there is a projector for each camera that is used. Proper registration is obtained by adjusting each of the individual projectors. N. A. Valyus in Stereoscopy (Focal Press, 1966) discusses the importance of having proper registration of an image to obtain the 3-D effect at page 201.

Takanori Okoshi in Three Dimensional Imaging Technique (Academic Press, 1976) at page 88 discusses changing the angle of projection to a certain angle to give spread to the image upon the emulsion.

By using an image recognition device, when printing 2D views taken by a multi-lens camera without camera-to-key subject codes on the negative, a video camera can be used to register the key subject image of the first 2D view by digitizing the image of the key subject and to store the information with an image grabber as reference. After exposing the first 2D view to the print material, the second 2D view will be transported to the approximate location of the first 2D view. The video camera will then compare the key subject image of the second 2D view with the information of the first 2D view captured by the image grabber, and align the second 2D view to register with the first 2D view by an X Y positioning device.

SUMMARY OF THE INVENTION

It is an object of the present invention to provide an apparatus and method for the automatic positioning of each 2D negative view from the printer to align the key subject so that it is accurately registered on the lenticular print material in order to produce an in focus 3D photograph. It is an object of the present invention to provide an apparatus and method for the composing of the 3D photograph without the necessity of manually or visually aligning the key subject of each 2D negative view so that it is properly registered on the lenticular print material. It is an object to accomplish this alignment automatically at high speed with accurate registration of the key subject of each 2D view.

It is a further object of the present invention to provide an apparatus and method for exposing a key subject distance code or focusing distance code on the negative to indicate the distance between the key subject of the picture and the camera at the time the 3D photograph is taken.

Figure 5:
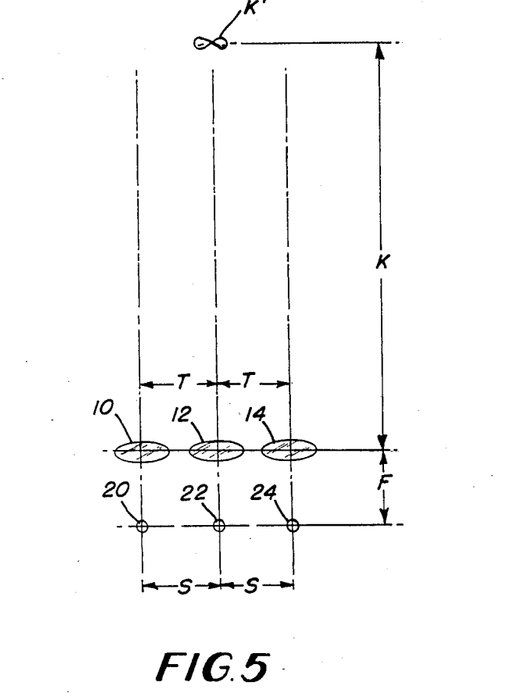
FIG. 5 is a diagramatic view showing the location of a key subject at infinity and the location of the key subject image in each of the three views on the negative.
Figure 6:
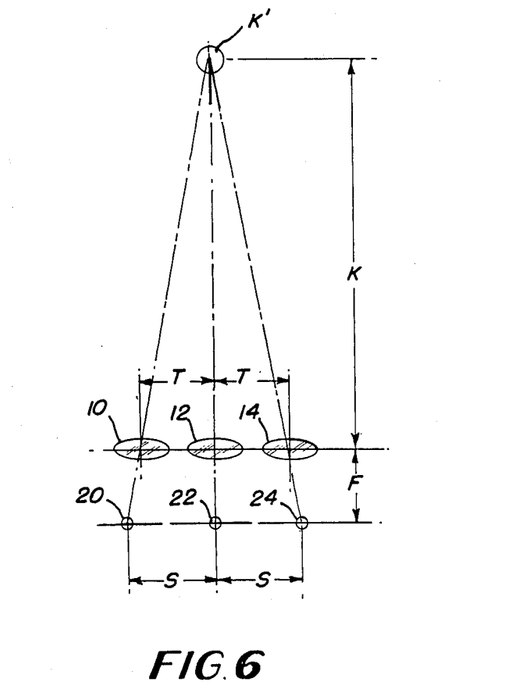
FIG. 6 is a diagramatic view which shows the location of the key subject at a relatively close range and the location of the key subject image in each of the three views on the negative.
Figure 7:
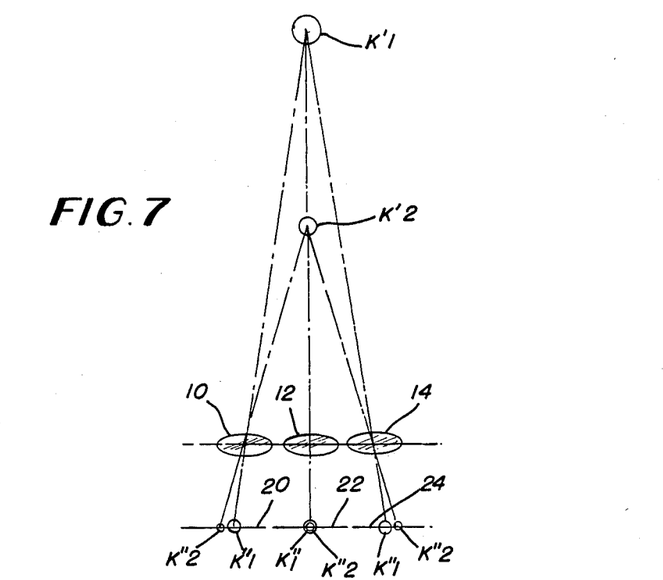
FIG. 7 is a diagramatic view of a three lens camera taking a photograph which illustrates the relative location of key subject images in each of the three views on the negative when the key subjects are at different distances.

For each 3D photograph taken by a multi-lens camera, the spacing between the key subject image of adjacent 2D views is different, depending upon the distance between the camera and the key subject at the time the photograph is taken (FIG. 7). When a multi-lens camera takes a photograph of a key subject at infinity, the spacing between the key subject image of adjacent 2D views is approximately equal to the spacing between the two adjacent camera lenses (FIG. 5). However, when a photograph is taken of a close-up key subject, the spacing between the key subject image of adjacent 2D views is greater than the spacing between the adjacent camera lenses (FIG. 6).

When composing a 3D photograph exposed by a multi-lens camera, the key subject image on each of the 2D views must be accurately aligned and registered on the 3D print in order to produce a sharp 3D photograph.

When the spacing between the camera lenses and the back focal length of the camera are known, the spacing between the key subject image of adjacent 2D views can be computed for each set of the 2D views photographed by the following equation:

$$S = \frac{(K + F)T}{K}$$

S is the distance between the key subject images of the adjacent 2D views.

F is the back focal length of the camera lens of the multi-lens camera.

T is the separation between each adjacent camera lens of the multi-lens camera.

K is the distance between the camera and the key subject.

By knowing the S value of each set of 2D views, the 2D views of each 3D photograph can be automatically aligned to register the key subject images on the 3D print by controlling the travelling distance of the negative carrier of the printer.

The automatic registration of the key subject images of the 2D views for the composing of a 3D photograph can be accomplished as follows:

(1) The multi-lens camera has a mechanism for coding the camera -to- key subject distance K on the negative each time a photograph is taken. This may be a computer-readable code which can be read by a device during the printing of the negative. The printer has a computer or microprocessor which controls the travelling distance of the negative in the negative carrier between exposures. The device which reads the code will transfer this information to the computer which will utilize the above equation to determine the travelling distance between exposure for each set of views. The equation can be programmed into the computer or all the data or a selected number of K values can be stored in the computer. For any particular model of multi-lens camera the T and F values are known. Consequently, the only variable is K which is coded onto the film. The S values in this way can be either pre-calculated or calculated by the computer at the time of printing. In this way, each of the 2D views is aligned and registered properly so that the key subject image of each 2D view is in focus.

In lieu of a computer-readable code, the camera can have a device for putting a human readable code on the negative. Under these circumstances, the printer operator will need to key into the computer or microprocessor the code, for each set of 2D views so that the computer can make the necessary calculations to align the key subject of each 2D view during printing.

(2) If the multi-lens camera does not have a mechanism for coding on the negative, the operator can be trained to judge the camera-to-key subject distance by estimating the size of a familiar object (e.g. head size of a person) in the photograph and to key this distance into the computer for each set of 2D views so that the computer can properly align the printer during printing.

DETAILED DESCRIPTION OF THE DRAWINGS

Figure 1:
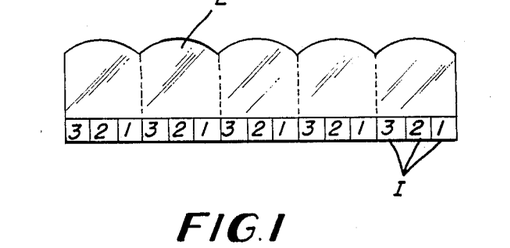
FIG. 1 is an enlarged diagramatic cross sectional view of a three- dimensional photograph.

In lenticular type three-dimensional (3D) photography, a plurality of two-dimensional (2D) views of the scene are taken from a number of horizontally spaced vantage points and the series of 2D images is then composed and printed at the focal plane of each of the lenticules of the lenticular screen to form a 3D composite image of the scene. FIG. 1 illustrates the cross-section of a lenticular type three-dimensional photograph in which there are three images I in each lenticule L.

Figure 2:
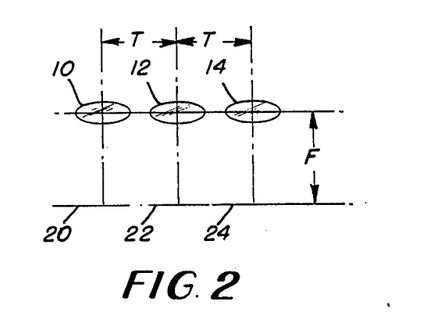
FIG. 2 is a diagramatic view of a three lens camera for taking multiple two-dimensional images for composing a three-dimensional photograph.

Lenticular type 3D photographs are produced in a two step process. In the first step a multi-lens camera is used to take a number of 2D views of the scene. FIG. 2 is a diagramatic view of a three lens 10, 12 and 14 camera for taking three views of a scene at the same time. The camera is illustrated as having negative frames 20, 22 and 24. Negative frames 20, 22 and 24 are exposed at the same time to the same scene.

Figure 4:
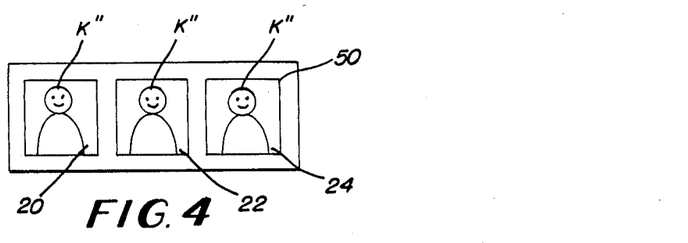
FIG. 4 is a diagrmatic view of multiple two-dimensional images taken by the three lens camera with the pictures showing a key subject image.
Figure 8:
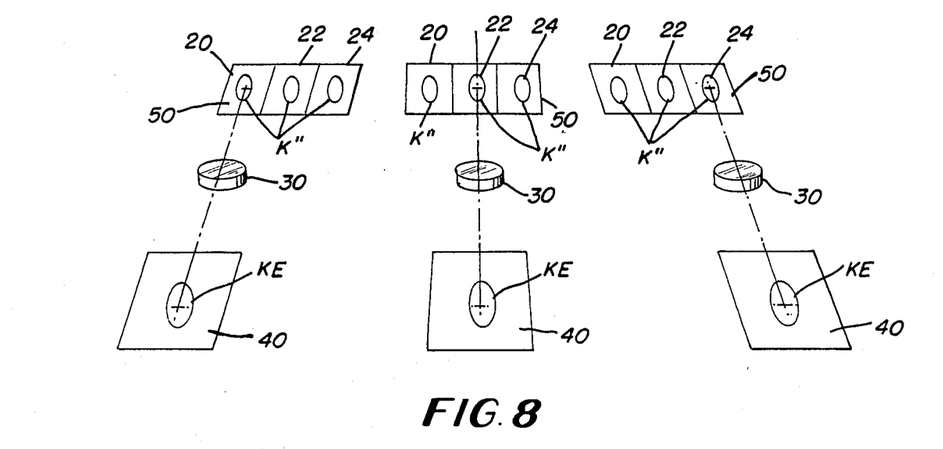
FIG. 8 is a diagramatic view illustrating the basic method for composing of a three-dimensional photograph and the relative sequence of such composing.

The next basic step is composing the two-dimensional negative frames 50 composed of negative frames 20, 22 and 24 as illustrated in FIG. 4 by placing the negative frames 50 in the negative carrier (not shown) on the printer as illustrated in FIG. 8. In the past the key subject K' as illustrated in FIG. 4 and FIG. 8 in each negative frame 20, 22 and 24 is visually aligned with the lenticular print material 40 (FIG. 8). Each negative frame 20, 22 and 24 is projected through enlarging lens 30 to the proper position on the lenticulated print film 40. In the past, the person operating the printer would position negative frame 20 into the light gate of the printer to align K' to cause the enlarged key image KE to be properly registered at point 80 on the lenticular print material 40. Negative frame 20 would then be exposed which results in exposing the emulsion under one of the bands, 1, 2 or 3 in the lenticule shown in FIG. 1. This process and visual alignment would then be repeated with negative frames 22 and 24.

Figure 3:
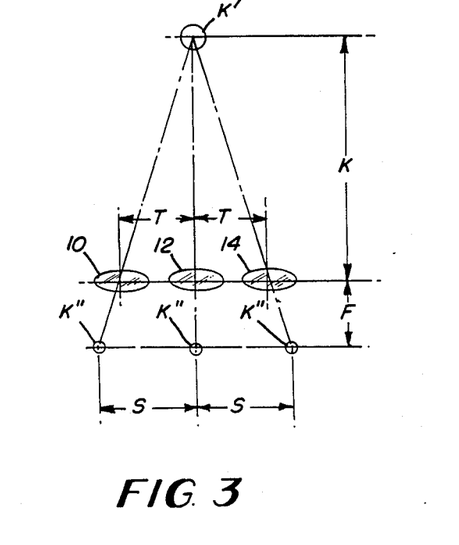
FIG. 3 is a diagramatic view showing a three lens camera taking of a 3D photograph with a key subject.

This process of visual alignment of each frame can be done by an optical or video device or with cross hairs for registering the key subject on the print material. The widespread commercial use of 3D photographs has been limited because of the cumbersome method of aligning each frame of the negative. This process is not only time consuming but is unreliable because the operator may sometimes not properly align the frames due to fatigue caused by this tedious process. This cumbersome method of manually aligning the key subject in each two-dimensional frame of a negative can be avoided by applicant's method for automatically calculating the distance between key subject images. The distance S between key subject image K' of adjacent 2D negative frames (FIG. 3) can be calculated by the following equation:

$$S = \frac{(K + F)T}{K}$$

where S is the distance between key subject images of adjacent 2D views,

T is the separation between adjacent camera lenses,

F is the back focal length of the camera lens, e.g. 14 and 24 of FIG. 2,

K is the distance between the lens of the camera and the key subject K' as illustrated in FIGS. 3, 5 and 6.

For any given multi-lens camera the values of T and F will remain a constant. Consequently, the only variable is the distance K between the camera lens and the key subject. If, for example, a particular camera has a T value of 20 mm and an F value of 30 mm, we can easily calculate the value of S at different key subject distances. If in a particular set of two-dimensional negative views the value of K is 1524 mm (5 feet) the value of S is computed as follows:

$$S = \frac{(1524 + 30)20}{1524}$$

S=20.3937 mm

If the K has a value of 3048 mm (10 feet), the value of S can be computed as follows:

$$S = \frac{(3048 + 30)20}{3048}$$

S=20.1968.

The S values for a set of two-dimensional negatives taken by multi-lens camera can be computed by microprocessor or computer.

Figure 12:
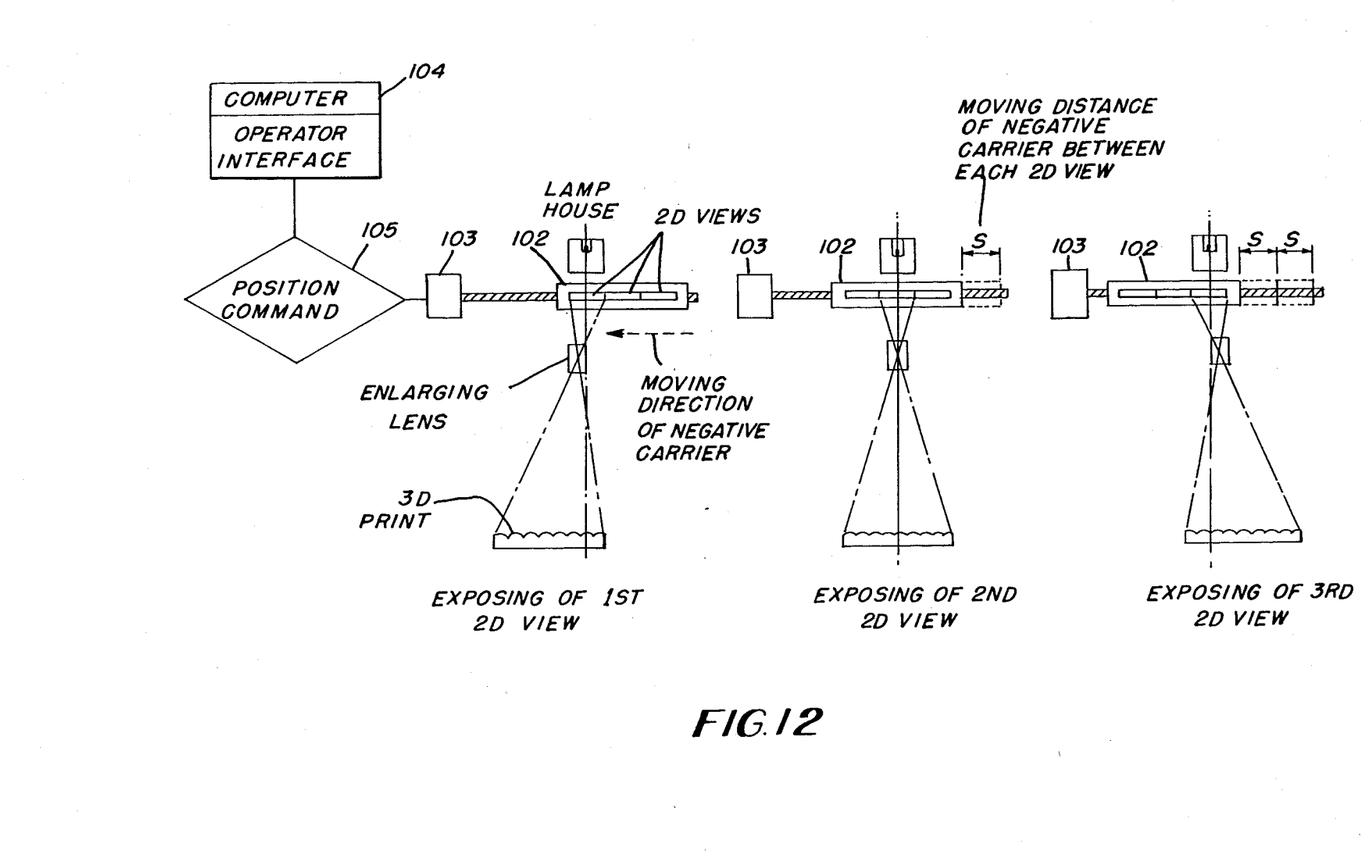
FIG. 12 is a diagramatic view of a printer with a computer for controlling the travel of the negative carrier between the printing of views.

FIG. 12 is a diagramatic view of a printer which has a computer for controlling the travel of the negative carrier between exposures. A stepping motor 103 is used for moving the negative carrier. A computer 104 controls the stepping motor to stop and start the travel of the negative carrier. If the printer is printing three-dimensional photographs that are taken by a known model of a camera the value of T and F will be known and can be programmed into the computer 104 or microprocessor. If the model of the camera is not known or the operator is uncertain of the precise distance of T due to mispositioning of the camera lens in the manufacturing process then the operator can check the first set of negative views and measure the value of T and F by an electro-optic measurement device in the printer. Consequently, for each set of two-dimensional frames, the only variable will be K. In most consumer photography, pictures are taken from approximately two to thirty feet. In order to simplify this process, the computer 104 can be programmed for a limited number of K values (e.g. 2', 3', 4', 5', 7', 10', 15', 20', 30' infinity). The above equation can be programmed into the computer if it is desired to have more precise K values. The computer will utilize the equation in computing the S value.

The difference in S values between taking a photograph of a key subject at position K'1 or K'2 is illustrated in FIG. 7 which is a diagramatic view of a 3 lens camera taking a photograph. This figure illustrates the different location of K''1 and K''2 on negative frames 20 and 24. The location is the same in respect to negative frame 22 between pictures of K''1 and K''2 because they are located at the optical center of camera lens 12.

Figure 9:
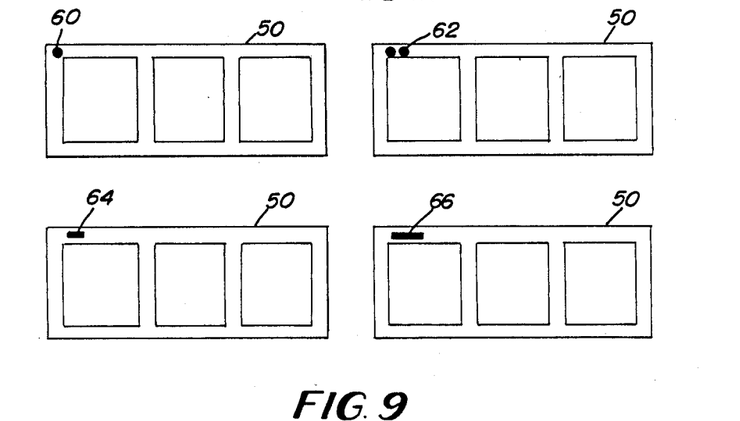
FIG. 9 is a diagramatic view of a photographic negative with two-dimensional views which have been taken by a multi-lens camera with a computer readable key subject distance or focusing distance code on each series of three images.
Figure 10:
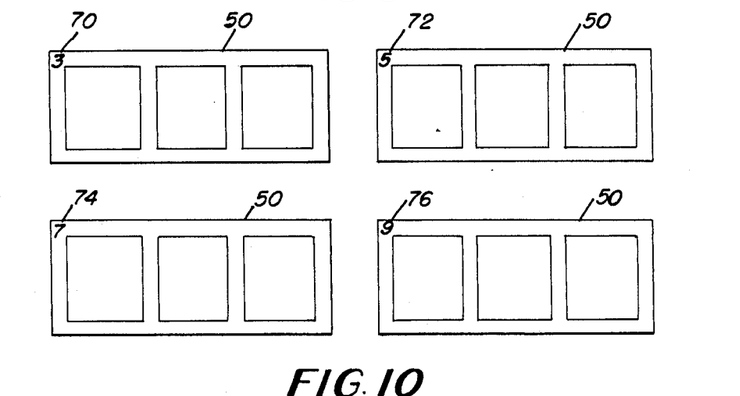
FIG. 10 is a diagramatic view of a photographic negative with two dimensional images with a human readable key subject distance or focusing distance code on each series of images.

The fully automated system for determining and utilizing S values involves the three-dimensional camera having a mechanism for coding the K value on the film. FIG. 9 shows a set of three negative frames with varying types of computer readable code, 60, 62, 64, 66. It is necessary to code the K value on the film in the camera each time a picture is taken. This can be accomplished by a mechanism that exposes the film to light to form a code as the lens is brought into focus and a picture taken. Alternatively, each set of views can be marked mechanically as the lens is brought into focus on the key subject and a picture taken. Similarly, it is also possible to print F and T values of the camera onto the film for computer reading as well. The K value will need to be printed on each set of views in order to bring those key subject images into proper registration on the lenticulated print film.

Figure 11:
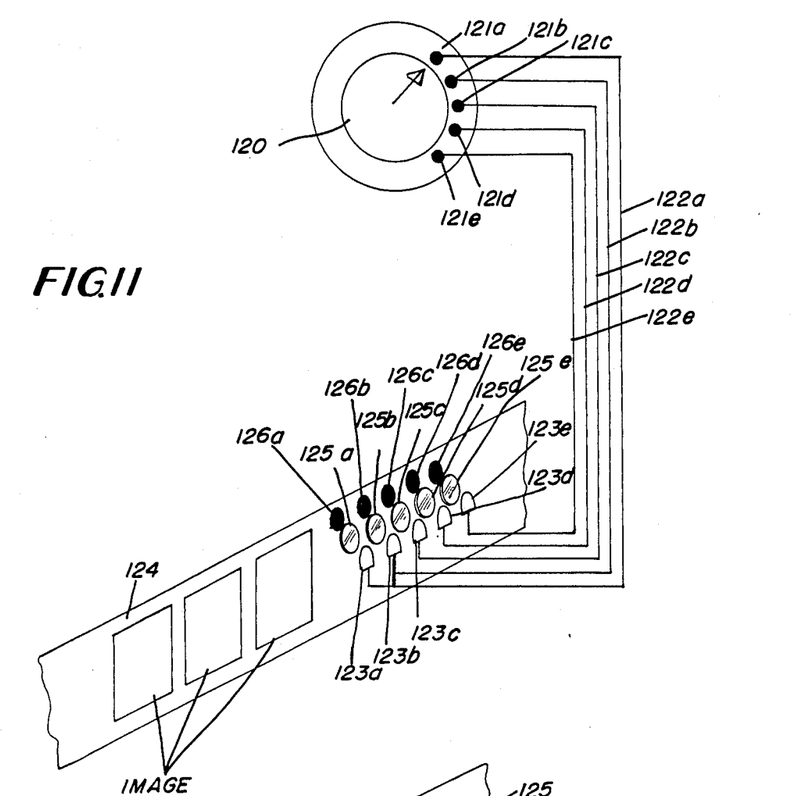
FIG. 11 is a diagramatic view of a light emitting diode device in a camera for putting a focusing code on each series of images.

FIG. 11 illustrates a device for coding the K value on the negative at the time a picture is taken. The camera has a focusing ring 120 for focusing the lens (not shown) on the subject, which may be either automatic or manual focusing. There are a plurality of sensors 121 beneath the focusing ring. Once the camera is properly focused the sensor (e.g. 121a) located at the focused distance on the ring 120 will be activated at the time the shutter is opened. Electric current is transmitted by electric wire (e.g. 122a) to a light emitting diode (e.g. 123a) which will emit light through lens (e.g. 125a) onto the negative 124. The location of the code 126a–e on the film indicates the distance (K) for each set of views taken by a multilens camera.

Figure 13:
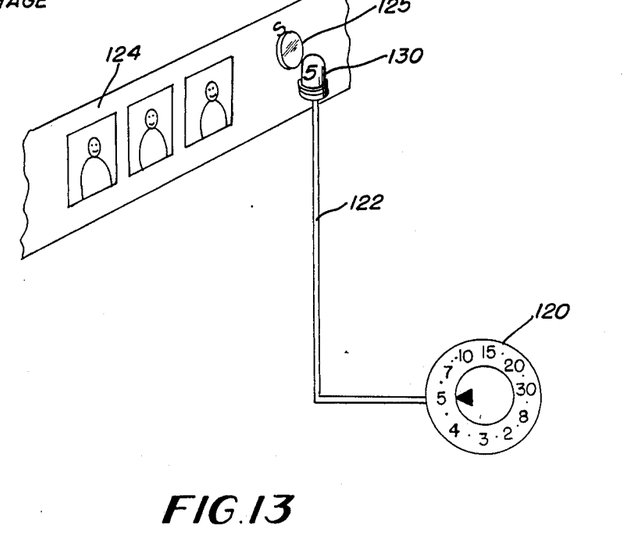
FIG. 13 is a diagramatic view of a light crystal diode device in a camera for putting a focusing code on each series of images.

A light crystal diode array (LCD) can be used in place of a LCD array as illustrated in FIG. 13 which is similar to FIG. 11. Sensors (not shown) are located beneath the focusing ring 120 connected by an electric wire 122 to a light crystal diode 130 which will emit a code S through lens 125 onto the negative 124. The code may be the appropriate number on the focusing ring 120.

The negative with the computer readable code printed on it is taken to a printer as illustrated in FIG. 12. The negative carrier 102 of the printer is moved from each 2D view to the next one by a stepping motor 103. This stepping motor is controlled by a computer 104 or a microprocessor through a position commander 105. The term computer also includes microprocessor for the purpose of this invention. An optical device (not shown) can be installed on the printer to read the code for each set of views. This information is transmitted to the computer. The computer will either use the equation set forth above to compute the S values for each set of views or the S value for a selected number of K values can be stored in the computer. In utilizing this method it is only necessary for the operator to position the first view of each set. The computer will read the code to align the remaining views in that set and control the movement of the negative carrier by the distance S. The computer can readily determine the K values because the F and T values of the camera will be known. If the printer is only printing film taken by a single camera model then the F and T values will not change. If more than one model of camera is used the F and T values of the camera can be coded onto the film or the model number can be ascertained at the time the film is deposited for processing.

Alternatively, the camera can be designed to put a human readable code on each set of views as illustrated in FIG. 12. The human readable code can be numbers as illustrated by 70, 72, 74 and 76. This number can be the actual distance K between the camera and the key subject on which the camera lens is focused. When this approach is used the operator needs to position the first frame in each set and then utilizing the code to compute the S value. This can be done quickly with a small computer or with a conversion table for the main distances at which photographs are taken. In utilizing this system the operator will have to position the first 2D view for each set of negative frames.

The printer illustrated in FIG. 12 can be utilized with negatives on which there is a human readable code. The printer is then a semiautomatic system. It would be necessary for the operator to read the code on each set of negative frames and to punch the K value into the computer. The computer will then compute the S value for that set and move the negative carrier accordingly.

When printing 3D pictures taken by a multi-lens camera without a key subject distance code on the negative, the operator can be trained to judge the camera-to-key subject distance (K) by estimating the distance of a familiar object (e.g. head of a person). Once the operator has determined the K-value, it is easy to utilize the above equation from a table or to utilize a computer to compute the S value. The printer illustrated in FIG. 12 can be used in a semiautomatic way under these circumstances. The operator will simply punch in the K value on the computer based upon his estimate for each set of frames. The computer will then compute the S value and move the negative carrier accordingly.

It should be pointed out that when the picture is taken of the key object that is at a great distance, the S value approaches that of T. The S value is equal to the T value at infinity as illustrated in FIG. 5. From a practical standpoint at any distance in excess of 300 feet the value of S will be insignificantly greater than the value of T. Indeed, at such distance the value of T can be used in aligning he key subjects in a set of negative frames.

I claim:

1. A method of printing an image array on the photosensitive surface of lenticular print film from a set of 2D views on a negative taken by a multi-lens camera, said image array consisting of a multiplicity of stereoscopic image pairs of lineform image bands within each lenticule, said printing utilizing a printer having a movable negative carrier which comprises
   (a) determining the distance (K) from the camera to the key subject for each set of views on the negative in order to properly align and register the key subject on the lenticular print film so the 3D photograph is in proper focus by utilizing the following equation:

$$S = \frac{(K + F)T}{K}$$

where
   S is the distance between key subject images of adjacent 2-D views,
   T is the separation between adjacent camera lenses,
   F is the back focal length of the camera lens,
   K is the distance between the lens of the camera and the key subject K';
   (b) aligning in proper registration the first view of each set of views on the negative on the print film, and
   (c) moving the negative carrier of the printer by the appropriate S value between the printing of adjacent 2D views of a set of views on the negative.

2. The method of claim 1 in which the S values are determined by a computer which computes the S values and moves the negative carrier in accordance with such computation.

3. The method of claim 1 in which the S values are stored in the memory of the computer which moves the negative carrier by the amount of the S value.

4. The method of claim 2 in which each set of views on the negative has a readable code of the K value for such set of views, said code being marked on the negative at the time the picture is taken by the camera, with the K value being read for each set of views and transmitted to the computer for computing the S value.

5. The method of claim 4 in which the code on the negative for each set of views is a machine readable code.

6. In a printer for printing an image array on the photosensitive surface of lenticular print film from a set of 2D views taken by a multi-lens camera, said image array consisting of a multiplicity of stereoscopic image pairs of lineform image bands within each lenticule, said printer having a negative carrier and means for moving the negative carrier, said improvement comprising (a) a computer for controlling the movement of the negative carrier between the printing of each view in a set of 2D views by the proper distance so that the key subject is properly aligned and in registration on the print film, said computer utilizing the following formula for determining the proper amount to move the negative carrier between adjacent 2D views in a set of views:

$$S = \frac{(K + F)T}{K}$$

where
S is the distance between key subject images of adjacent 2D views,
T is the separation between adjacent camera lenses, F is the back focal length of the camera lens, K is the distance between the lens of the camera and the key subject K'.

7. The printer of claim 6 in which the S values are determined by the computer which moves the negative carrier in accordance with such computation.

8. The printer of claim 6 in which the S values are stored in the memory of the computer which moves the negative carrier by the amount of the S value.

9. The printer of claim 6 in which the printer has means for reading a machine-readable code imprinted on each set of views on the negative, and transmitting the code to the computer, the code indicating the K value of each set of negatives, with the K value being used by the computer to compute the S value and move the negative carrier accordingly.

* * * * *

UNITED STATES PATENT AND TRADEMARK OFFICE
CERTIFICATE OF CORRECTION

PATENT NO. : 4,903,069  
DATED : February 20, 1990  
INVENTOR(S) : Nicholas L. Lam Page 1 of 2

It is certified that error appears in the above-indentified patent and that said Letters Patent is hereby corrected as shown below:

IN THE DRAWINGS:  
Figure 8 should be deleted to appear as per attached sheet.

Signed and Sealed this

Fifteenth Day of March, 1994

Attest:

BRUCE LEHMAN

*Attesting Officer*      *Commissioner of Patents and Trademarks*

UNITED STATES PATENT AND TRADEMARK OFFICE
CERTIFICATE OF CORRECTION

PATENT NO. : 4,903,069
DATED : February 20, 1990
INVENTOR(S) : Nicholas L. Lam

It is certified that error appears in the above-indentified patent and that said Letters Patent is hereby corrected as shown below:

FIG. 8